United States Patent
Campbell

(10) Patent No.: US 10,462,879 B2
(45) Date of Patent: *Oct. 29, 2019

(54) POWERLINE COMMUNICATION CONTROL OF LIGHT EMITTING DIODE (LED) LIGHTING FIXTURES

(71) Applicant: Lumenpulse Group Inc., Montreal (CA)

(72) Inventor: Gregory Campbell, Walpole, MA (US)

(73) Assignee: Lumenpulse Group Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,364

(22) Filed: Mar. 1, 2017

(65) Prior Publication Data

US 2017/0171947 A1 Jun. 15, 2017

Related U.S. Application Data

(63) Continuation of application No. 15/053,432, filed on Feb. 25, 2016, which is a continuation of application
(Continued)

(51) Int. Cl.
*H04B 3/54* (2006.01)
*H05B 37/02* (2006.01)
(Continued)

(52) U.S. Cl.
CPC ..... *H05B 37/0263* (2013.01); *H05B 33/0809* (2013.01); *H05B 33/0845* (2013.01);
(Continued)

(58) Field of Classification Search
CPC ...... H04B 3/54; H04B 3/542; H05B 37/0263; H05B 33/0833; H05B 33/0854
See application file for complete search history.

(56) References Cited

U.S. PATENT DOCUMENTS

| 4,815,106 A | 3/1989 | Propp et al. |
| 4,889,999 A | 12/1989 | Rowen |

(Continued)

FOREIGN PATENT DOCUMENTS

| AU | 20090200556 | 9/2009 |
| EP | 1460775 A1 | 9/2004 |

(Continued)

OTHER PUBLICATIONS

Office Action from related European Application No. 12806309.6-1804 dated May 4, 2017.

*Primary Examiner* — Fritz M Fleming
(74) *Attorney, Agent, or Firm* — Burns & Levinson, LLP; Joseph M. Maraia

(57) ABSTRACT

A powerline communication control system for controlling a lighting unit, such as an LED lighting unit, including a master controller for receiving lighting unit control inputs from a lighting controller and generating corresponding lighting unit command outputs in a lighting system command format and transmission mode and superimposing the lighting unit command outputs onto the power distribution system and at least one lighting slave unit for receiving the lighting command signal, separating the lighting command signal from the power signal and for providing lighting unit control commands to the at least one lighting unit to control illumination thereof.

5 Claims, 6 Drawing Sheets

Related U.S. Application Data

No. 14/675,905, filed on Apr. 1, 2015, now Pat. No. 9,307,619, which is a continuation of application No. 14/292,083, filed on May 30, 2014, now Pat. No. 9,024,464, which is a continuation of application No. 13/781,003, filed on Feb. 28, 2013, now Pat. No. 8,759,999, which is a continuation of application No. 13/336,299, filed on Dec. 23, 2011, now Pat. No. 8,410,630, which is a continuation-in-part of application No. PCT/US2011/044159, filed on Jul. 15, 2011.

(60) Provisional application No. 61/365,026, filed on Jul. 16, 2010.

(51) Int. Cl.
  *H05B 33/08* (2006.01)
  *H05B 3/54* (2006.01)

(52) U.S. Cl.
  CPC .......... *H05B 33/0854* (2013.01); *H04B 3/54* (2013.01); *H05B 3/54* (2013.01)

(56) References Cited

U.S. PATENT DOCUMENTS

| | | | |
|---|---|---|---|
| 5,260,974 A | 11/1993 | Johnson et al. | |
| 5,455,490 A | 10/1995 | Callahan et al. | |
| 5,668,446 A | 9/1997 | Baker | |
| 5,828,293 A | 10/1998 | Rickard | |
| 6,664,745 B2 | 12/2003 | Belliveau | |
| 6,867,558 B2 | 3/2005 | Gaus, Jr. et al. | |
| 7,230,522 B2 | 6/2007 | Stevens | |
| 7,307,542 B1 | 12/2007 | Chandler et al. | |
| 7,456,588 B2 | 11/2008 | Alexandrov | |
| 7,865,252 B2 | 1/2011 | Clayton | |
| 8,410,630 B2 | 4/2013 | Campbell | |
| 9,024,464 B2 * | 5/2015 | Campbell | H05B 37/0263 307/1 |
| 2002/0065583 A1 | 5/2002 | Okada et al. | |
| 2002/0163316 A1 | 11/2002 | Lys et al. | |
| 2003/0146715 A1 | 8/2003 | Suomi | |
| 2004/0225811 A1 | 11/2004 | Fosler | |
| 2005/0225976 A1 | 10/2005 | Zampini et al. | |
| 2006/0170376 A1 | 8/2006 | Piepgras et al. | |
| 2006/0274540 A1 | 12/2006 | Klaver et al. | |
| 2007/0057641 A1 | 3/2007 | Russell et al. | |
| 2007/0233323 A1 | 10/2007 | Wiemeyer et al. | |
| 2007/0247089 A1 | 10/2007 | Summerland | |
| 2008/0150450 A1 | 6/2008 | Starr et al. | |
| 2008/0157939 A1 | 7/2008 | Sutardja | |
| 2008/0224636 A1 | 9/2008 | Melanson | |
| 2008/0297065 A1 | 12/2008 | Mubasiat et al. | |
| 2009/0171510 A1 | 7/2009 | Hu | |
| 2009/0184662 A1 | 7/2009 | Given et al. | |
| 2010/0090607 A1 | 4/2010 | Vos | |
| 2010/0102747 A1 | 4/2010 | Ilyes et al. | |
| 2010/0141169 A1 | 6/2010 | Summerland et al. | |
| 2010/0176733 A1 | 7/2010 | King | |
| 2011/0032085 A1 | 2/2011 | Maros et al. | |
| 2011/0043124 A1 | 2/2011 | Johnston et al. | |
| 2011/0050113 A1 | 3/2011 | VanDoorme et al. | |
| 2011/0050132 A1 | 3/2011 | Hooijer et al. | |
| 2011/0121754 A1 | 5/2011 | Shteynberg et al. | |
| 2011/0140611 A1 | 6/2011 | Elek et al. | |
| 2011/0187275 A1 | 8/2011 | Giltaca et al. | |
| 2011/0204820 A1 | 8/2011 | Tikkanen et al. | |
| 2011/0276193 A1 | 11/2011 | Bowman et al. | |
| 2011/0291583 A1 | 12/2011 | Shen | |
| 2012/0133298 A1 | 5/2012 | Campbell | |

FOREIGN PATENT DOCUMENTS

| | | |
|---|---|---|
| GB | 2335334 | 9/1999 |
| JP | 2009054987 | 3/2009 |
| WO | 2009013656 | 1/2009 |
| WO | 20090133489 | 11/2009 |
| WO | 20110121011 | 10/2011 |
| WO | 20120009622 | 1/2012 |

\* cited by examiner

POWERLINE COMMUNICATION CONTROL OF LIGHT EMITTING DIODE (LED) LIGHTING FIXTURES

RELATED APPLICATIONS

This application is a continuation of U.S. application Ser. No. 15/053,432, filed Feb. 25, 2016, which is a continuation of U.S. patent application Ser. No. 14/675,905, filed Apr. 1, 2015, now U.S. Pat. No. 9,307,619, which is a continuation of U.S. patent application Ser. No. 14/292,083, filed May 30, 2014, now U.S. Pat. No. 9,024,464, which is a continuation of U.S. patent application Ser. No. 13/781,003, filed Feb. 28, 2013, now U.S. Pat. No. 8,759,999, which is a continuation of U.S. patent application Ser. No. 13/336,299, filed Dec. 23, 2011, now U.S. Pat. No. 8,410,630, which is a continuation-in-part of International Application No. PCT/US11/44159, which designated the United States, and was filed on Jul. 15, 2011, which claims priority to U.S. Provisional Patent Application No. 61/365,026, filed on Jul. 16, 2010. The entire teachings of the above applications are incorporated herein by reference.

FIELD OF THE INVENTION

The present invention is related to the powerline communication control of electrical devices and, in particular, to the powerline communication control of lighting fixtures.

BACKGROUND

Powerline communication systems, often called powerline carrier communication system, are method for enabling systems to carry data on a conductor that is also used for electric power transmission, such as a conventional 117 volt AC line, a 230 volt AC line (such as used in Europe), a 100 volt AC line (such as used in Japan), a 277 volt AC line (such as used in certain commercial applications in the United States) or a 347 volt AC line (such as used in certain commercial applications in the Canada). There are many different ways to communicate on a powerline, but ultimately all communication is done by impressing a modulated carrier signal onto the system power conductors together with the 117 volt AC power signal and separating the power signal and the communications signals at a receiving point. While powerline communication applications are commonly seen in the utility meter reading and home automation markets, for example, for a number of reasons they are essentially nonexistent in architectural solid state lighting systems.

Among the problems that are hindering the adoption of solid state lighting systems, that is, light emitting diode (LED) lighting systems, and especially white light lighting systems, is the question of control of the light level output of LED lighting systems, that is, dimming control, which is much more complex than in the case of conventional lighting systems because of the greater electrical complexity of the LED lighting fixtures. For example, two of the common industry standard methods for dimming control of lighting systems are 0-10V dimmers and the Digital Array Lighting Interface (DALI), both of which provide digital control of the power output of lighting systems. Both of these methods are effective, but require the provision of control wiring separate from the conventional AC power lines. The addition of 0-10V dimmers or DALI to a lighting installation thus generally requires the retrofitting of any proposed installation site with the necessary control wiring, which typically requires ripping out existing wiring and the addition of new control wiring. The addition of convention dimming controls, such as 0-10V dimmers or DALI to a lighting installation thereby often imposes significant additional costs as well as additional time to accomplish the installation of the control wiring and controls.

There are existing dimming technologies used for traditional lighting sources which do not require extra communication wires. While there are many, two of the most popular are TRIAC (triode for alternating current) dimmer and Electronic Low Voltage (ELV) dimming. Both "phase chop" the AC signal, making less AC power available for the traditional light sources, hence causing the traditional light sources to provide less light output. These dimming technologies have been adapted to solid state lighting fixtures, however, since they are analog in nature, they are not an ideal solution due to the strictly digital nature of LEDs. There are two distinct disadvantages to incorporating TRIAC or ELV on the LED fixture. For example, there is an added cost associated with adding analog circuitry in order to transmit TRIAC or ELV dimming signals over a power line and to convert the analog signals to digital signals suitable for controlling LED fixtures. In addition, the addition of such specific purpose circuitry commits the LED fixture manufacturer to one technology, thus limiting the ability of the manufacturer to adapt to other dimming technologies that may be required in different applications and installations.

The present invention provides a solution to the above noted as well as other related problems associated with the prior art.

SUMMARY

The present invention is directed to a powerline communication control system for controlling a light emitting diode (LED) lighting unit comprised of one or more white or red, green and blue LEDs, or combinations thereof, and the associated circuitry for controlling the light outputs of the LEDs of the fixture.

A powerline communication control unit of the present invention includes a master controller that includes a lighting control command processor for receiving a lighting unit control input from a lighting controller and generating corresponding lighting unit command outputs in a lighting system command format and a power distribution system interface connected to a power distribution system for superimposing the lighting unit command outputs onto the power distribution system and a power signal present thereon as a lighting command signal according to a lighting unit command transmission mode.

The system further includes at least one lighting slave unit including at least one LED lighting unit, a command receiving interface connected from the power distribution system for receiving the lighting command signal, separating the lighting command signal from the power signal and generating corresponding slave control commands, a slave control processor for converting the received slave control commands into lighting unit control commands, and a lighting unit interface for providing the lighting unit control commands to the at least one lighting unit to control the at least one lighting unit.

In one embodiment of the present invention, each master controller includes: for each lighting controller, a corresponding lighting control conversion circuit for converting control inputs from a corresponding lighting controller into corresponding command inputs to the microprocessor.

In another embodiment of the present invention, a master controller includes: a lighting controller and a lighting control conversion circuit for converting control inputs from the lighting controller into the command inputs to the microprocessor.

In one aspect, at least one embodiment described herein provides a powerline communication control system for controlling a lighting fixture includes a master controller and at least one lighting fixture controller. The master controller includes a configurable interface, a lighting control processor and a power distribution system interface. The configurable interface is suitable for interconnecting to at least one of several different conventional dimmer controllers and the lighting control processor. The lighting control processor is adapted to generate a lighting unit command output in a lighting unit system command format in response to an indication of a user-adjusted setting of an interconnected one of the several different conventional dimmer controllers received from the configurable interface. The power distribution system interface is in communication with the lighting control processor and adapted for interconnection to a power distribution system. The power distribution system interface is adapted to superimpose the lighting unit system command output onto the power distribution system when connected thereto. The at least one lighting fixture controller includes a command receiving interface, a slave control processor and a lighting unit interface. The command receiving interface is adapted for interconnection to the power distribution system and for separating the lighting unit system command output from the power distribution system when connected thereto. The slave control processor is in communication with the command receiving interface and adapted to convert the received lighting unit system command output into a corresponding lighting unit control command. The lighting unit interface is configured for providing the lighting unit control command to at least one lighting unit. The lighting unit interface is configured to control the at least one lighting unit in response to the user-adjusted setting of the interconnected one of the conventional dimmers.

In another aspect, at least one embodiment described herein provides a master controller for powerline communication including a configurable interface suitable for interconnecting to one of several different conventional dimmer controllers. The master controller includes a lighting control processor and a power distribution system interface. The lighting control processor is in communication with the configurable interface and adapted to generate a lighting unit command output in a lighting unit system command format in response to an indication of a user-adjusted setting of an interconnected one of the several different conventional dimmer controllers received from the configurable interface. The power distribution system interface is in communication with the lighting control processor and adapted for interconnection to a power distribution system. The power distribution system interface is adapted to superimpose the lighting unit system command output onto the power distribution system when connected thereto.

In yet another aspect, at least one embodiment described herein provides a process for controlling a lighting fixture, including determining a user-adjusted setting of one of a plurality of different conventional dimmer controllers. The process also includes generating a lighting unit command output in a lighting unit system command format in response to the determined user-adjusted setting of the conventional dimmer controllers. The lighting unit command output is distributed through a power distribution system to at least one lighting fixture. The lighting unit command output is converted at the at least one lighting fixture into a corresponding lighting unit control command. At least one lighting unit is controlled in response to the user-adjusted setting of the interconnected one of the conventional dimmers.

BRIEF DESCRIPTION OF THE DRAWINGS

The invention will now be described, by way of example, with reference to the accompanying drawings in which.

DETAILED DESCRIPTION

Figure 1:
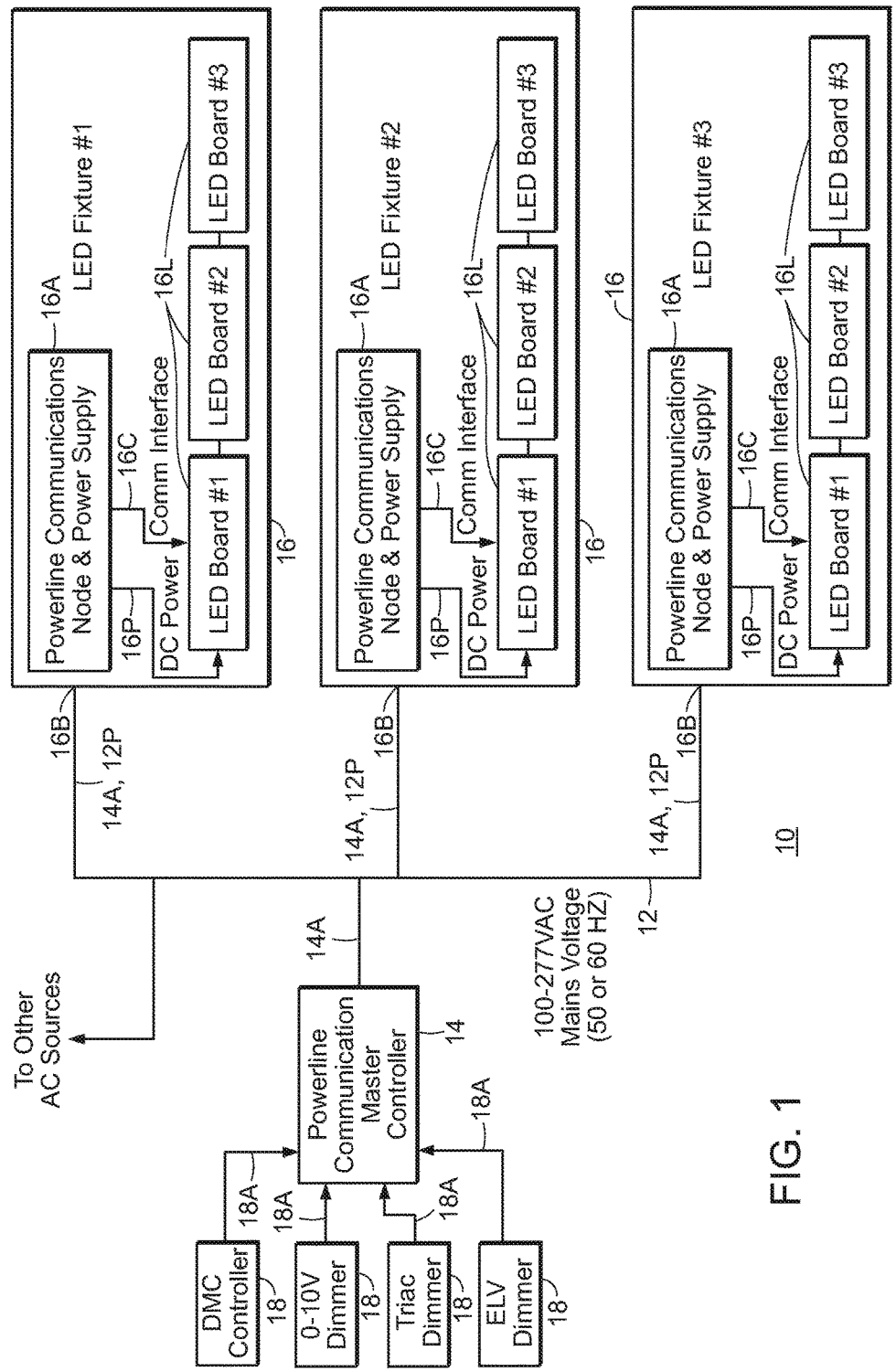
FIG. 1 is a functional block diagram of an embodiment of a powerline communication control system for LED lighting fixtures.

Referring to FIG. 1, a block diagram of a powerline communication control system 10 for LED lighting fixtures is shown therein. As illustrated, a powerline communication control system 10 of the present invention includes a conventional power distribution system 12, such as a 117 volt AC network, at least one master controller 14 and one or more LED fixture slave units 16 (three of which are diagrammatically shown in FIG. 1 but it is to be appreciated that the amount of the slave units 16 can vary depending upon the particular application). The control output 14A, from each master controller 14, is connected via the power distribution system 12, so as supply a separate control input to at least one, and more preferably a plurality, of the slave unit 16

Referring first to an exemplary master controller 14 is coupled to one or more conventional dimmer controllers 18 (four of which are diagrammatically shown in FIG. 1 but it is to be appreciated that the amount of the dimmer controllers 18 can vary depending upon the particular application). Each master controller 14 receives one or more dimmer control inputs 18A from one or more of the conventional dimmer controllers 18. It is to be appreciated that the dimmer controller 18 may include, for example, a Digital Multiplex (DMX) controller(s), a 0-10V Dimmer(s), a TRIAC dimmer(s) or an Electronic Low Voltage (ELV) Dimmer(s) and the dimmer control inputs 18A are conventional, standard output control signals of the corresponding types of dimmer controllers 18. More generally, any conventional electrical controller can be accommodated by providing a suitable interface for obtaining a controller setting. Other controllers include current loop controllers as commonly used in the industrial process control of instruments. One such class of controllers is known as 4-20 mA controllers.

The master controller 14, upon receipt of the dimmer control inputs 18A, first converts the conventional, standard control input or inputs 18A from the one or more master controllers 18 into corresponding powerline control signals 14A. Next, the master controller 14 imposes the powerline control signals 14A onto the wiring of the power distribution system 12, together with the conventional power signal 12P present on power distribution system 12, and also transmits the powerline control signals 14A through the power distribution system 12 to each one of the slave units 16. In a presently preferred embodiment of the present invention, the powerline control signals 14A may be, for example, in the form of a frequency shift keyed signal (FSK), a differential frequency signal (DFSK) or a differential phase shift keyed signal (DPSK). The command code format of the powerline control signals 14A may, for example, be that of a commercially available controller format or a version thereof modified for the specific needs of a powerline communication control system 10 or may be designed specific for the powerline communication control system 10.

According to the present invention, the powerline control signal 14A may be in the form of broadcast commands to all of the slave units 16 connected with the power distribution system 12, so that all slave units 16 are controlled concurrently and in parallel with one another. Alternately, the powerline control signals 14A may be specifically addressed to an individual slave unit 16, or to groups of the slave units 16, thereby allowing individualized control of one or more of the slave units 16 of the powerline communication control system 10.

Next referring to an exemplary slave unit 16, as illustrated in FIG. 1, the slave unit 16 includes one or more LED lighting units 16L (only three of which are diagrammatically shown in FIG. 1 but it is to be appreciated that the amount of the LED lighting units 16L can vary depending upon the particular application) and a communication and power supply node 16A. As indicated, each communication and power supply node 16A has a power and control input 16BA, 16BP which is connected with the power distribution system 12 in order to receive both the powerline control signals 14A and the power signal 12P from the power distribution system 12. As indicated in FIG. 1, the communication and power supply node 16A, of each slave unit 16, initially separates the received powerline control signals 14A from the received power signal 12P, and then generates a DC power output 16P from the power signal 12P, and then supplies the generated DC power signal 16P to the lighting units 16L in order to power the lighting units 16L as controlled by the master controller 14. The communication and power supply node 16A, of each slave unit 16, also decodes the received powerline control signals 14A and, in turn, then generates corresponding lighting control commands 16C and subsequently supplies the control commands 16C to the lighting units 16L so as to control the operation of the lighting units 16L.

Figure 2:
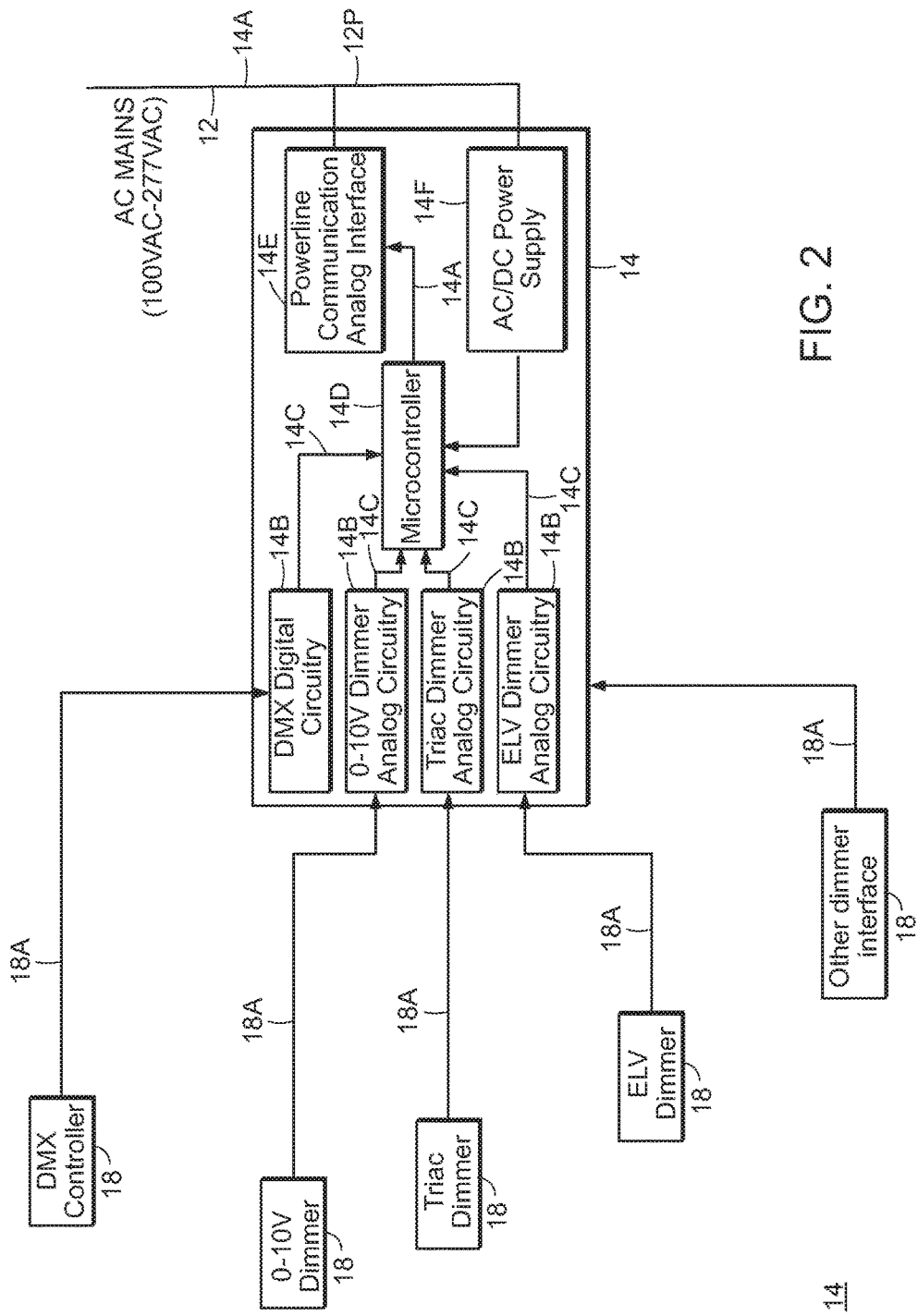
FIG. 2 is a functional block diagram of an embodiment of a master controller of a powerline communication control system for LED lighting fixtures.
Figure 3:
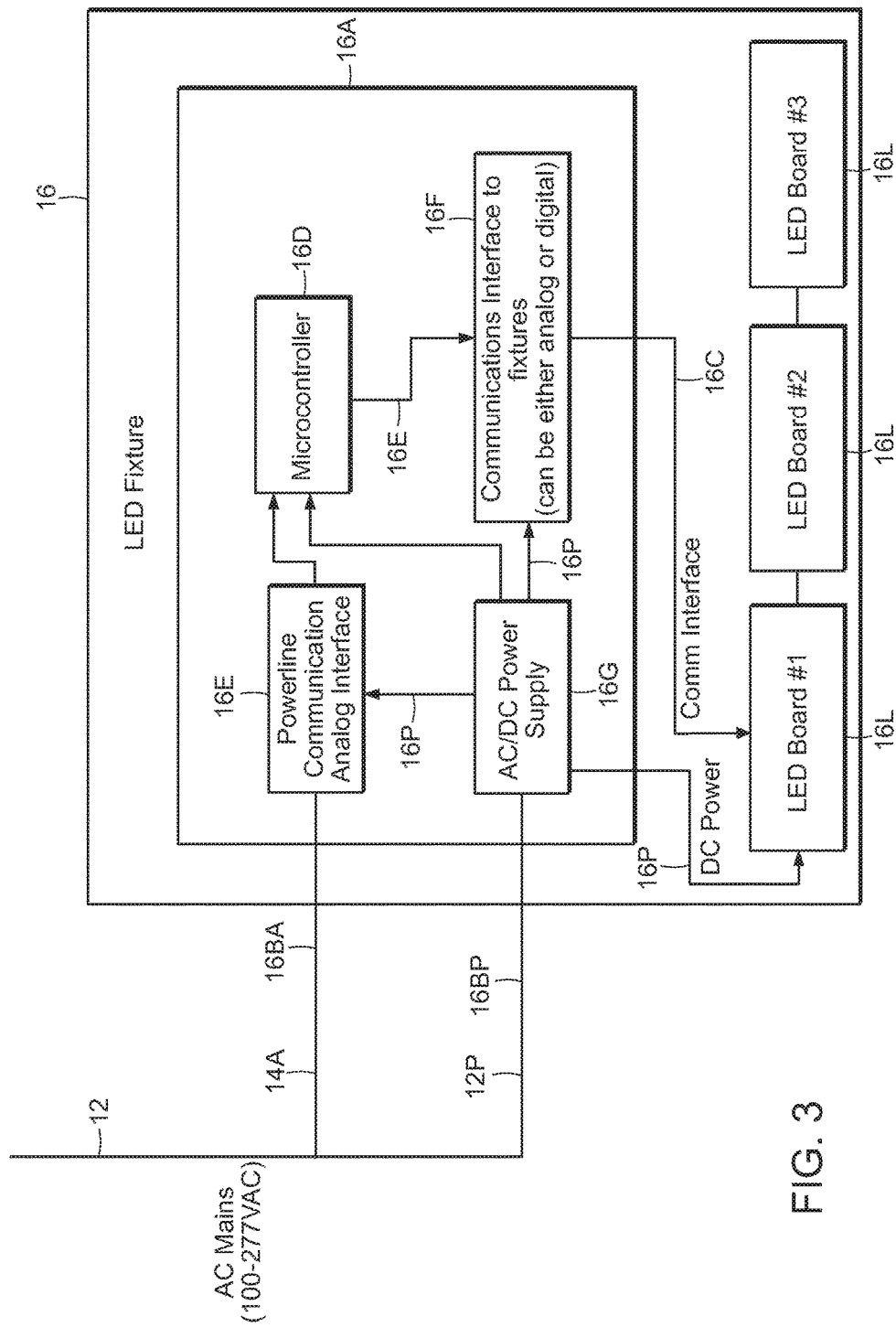
FIG. 3 is a functional block diagram of an embodiment of a slave LED lighting fixture unit of a powerline communication control system for LED lighting fixtures.

Referring next to FIGS. 2 and 3, more detailed block diagrams of both the master controller 14 and the slave unit 16, according to the present invention, are respectively shown therein. As illustrated in FIG. 2, each master controller 14 includes one or more dimmer control conversion circuits 14B for converting the control inputs 18A, from the corresponding dimmer controllers 18, into the corresponding dimmer command inputs 14C to a microprocessor 14D which, under control of at least one program(s) residing in a resident memory (not shown for purposes of clarity) to generate the corresponding powerline control signals 14A, which are then superimposed onto the wires of the power distribution system 12 and the power signal 12P present thereon by a powerline interface 14E for transmission of the slave units 16. As indicated, each master controller 14 will also include other necessary circuitry, such as a power supply 14F for receiving electrical power from the power distribution system 12.

Referring to FIG. 3, the power and control input 16B of each communication and power supply node 16A of each slave unit 16 includes a control input 16BA, connected to the power distribution system 12 and to the input of a communication interface 16B which receives the powerline control signals 14A and the power signal 12P from the power distribution system 12, separates the powerline control signals 14A from the power signal 12P, and provides corresponding control signals 14A to an input of a slave control microprocessor 160. The slave control microprocessor 160, operating under control of at least one program(s) residing in a memory (not shown for purposes of clarity), in turn, decodes control signals 14A and generates corresponding slave control signals 16E, which are converted into corresponding analog or digital lighting control commands 16C, by a fixture interface 16F, and then communicated to each one of the lighting units 16L.

A power input 16BP is likewise connected to the power distribution system 12 to receive the power signal 12 with the superimposed powerline control signals 14A and is connected to the input of a power supply 16G which, in turn, generates DC power outputs 16P which are supplied to the circuits of the communication and power supply node 16A and eventually to the lighting units 16L of the slave unit 16.

Figure 4:
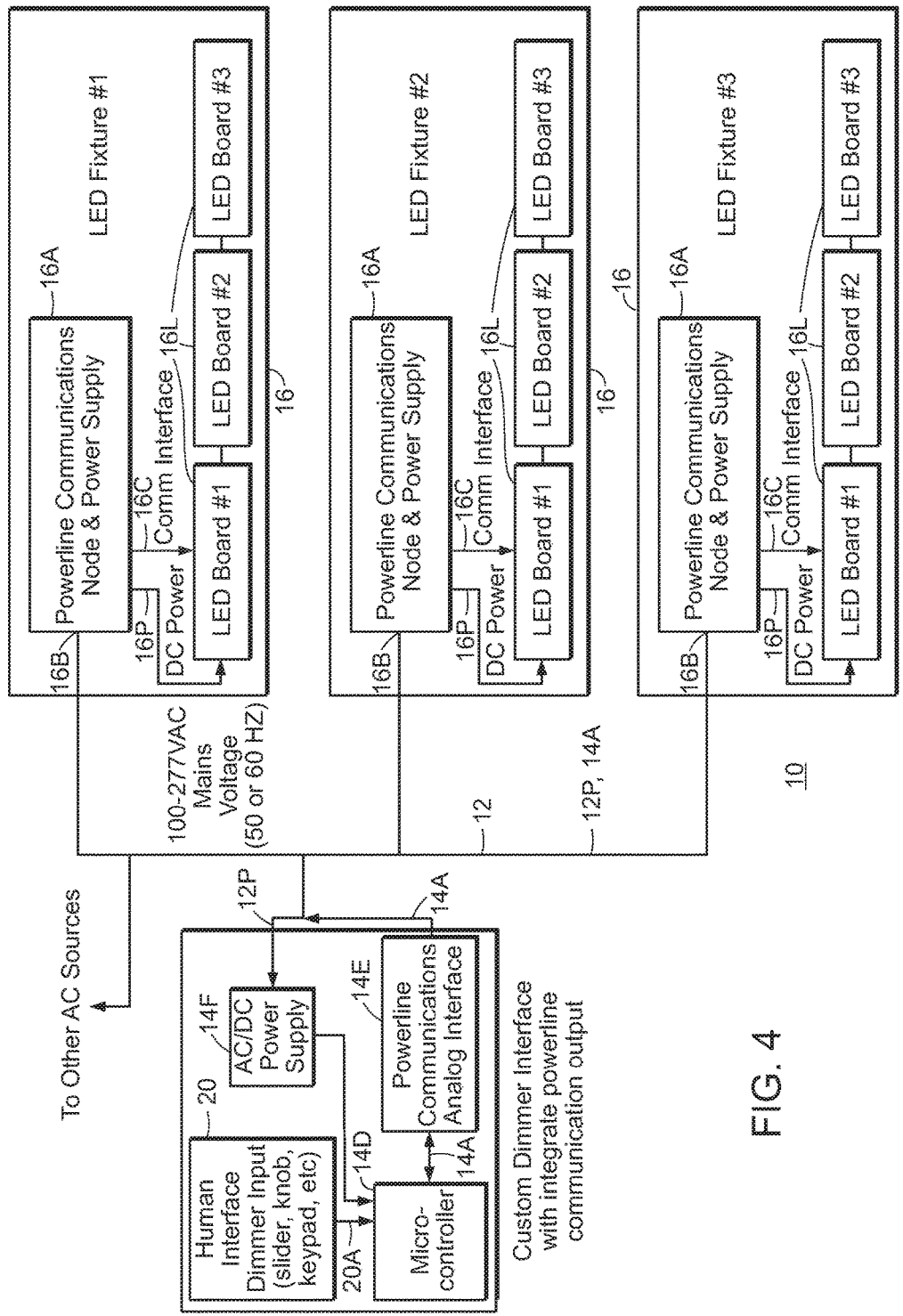
FIG. 4 is a functional block diagram of an alternative embodiment of a powerline communication control system for LED lighting fixtures.

Referring next to FIG. 4, a block diagram of an alternate embodiment of the powerline communication control system 10, according to the present invention, is shown therein. This embodiment, as illustrated in FIG. 4, is generally similar to the embodiments of a powerline communication control system 10 as illustrated in FIGS. 1, 2 and 3. However, according to this embodiment, the dimmer controllers 18 and the dimmer control inputs 18A are replaced with a human interface controller 20 for generating human interface control inputs 20A. It is to be appreciated that the control inputs 20A may be generated under the control of, for example, a knob, a slider, a keypad or some other conventional direct human input control device, thereby allowing direct human control of the slave units 16 without the associated intervention and cost of standardized, conventional dimmer controls 18.

Figure 5:
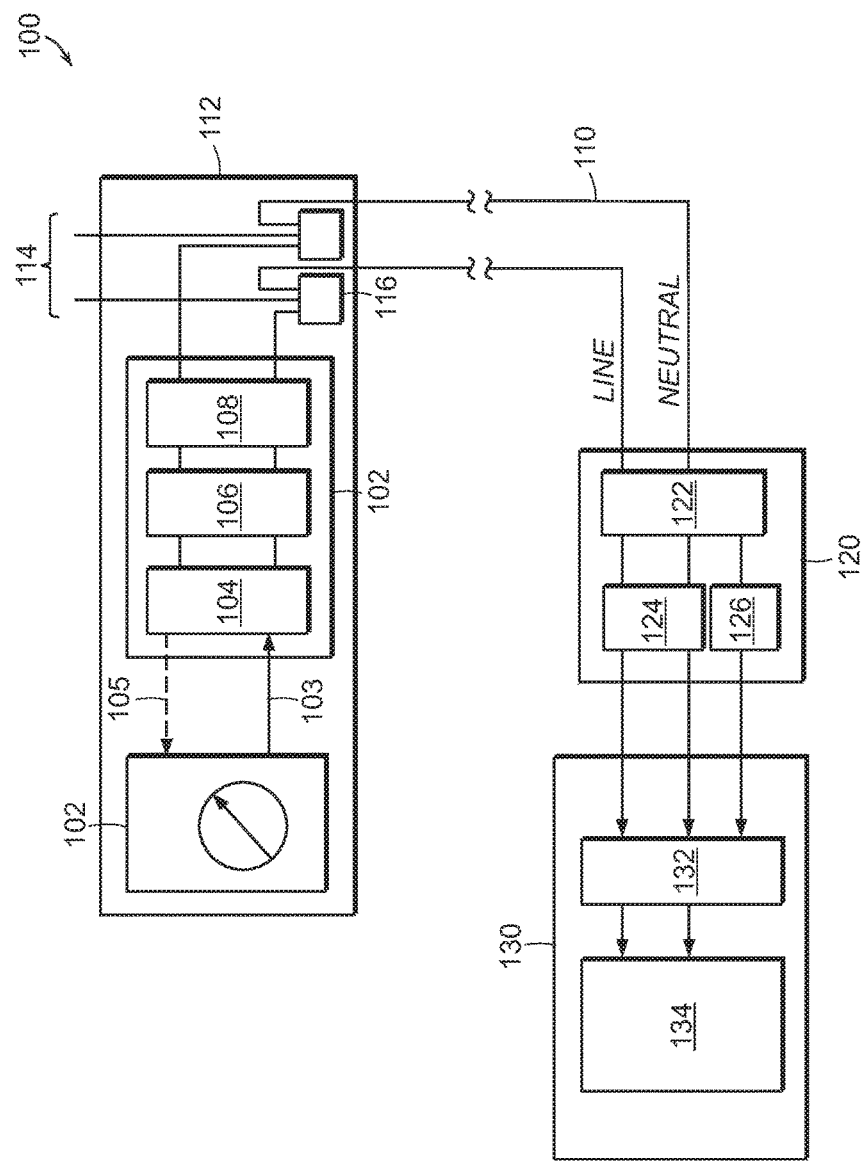
FIG. 5 is a functional block diagram of another embodiment of a powerline communication control system for controlling lighting fixtures.

FIG. 5 is a functional block diagram of another embodiment of a powerline communication control system 100 for controlling lighting fixtures. The system 100 includes a master controller, or adapter 102, configured to interpret a response or input 103 received from a conventional controller 102 (also referred to as a legacy controller). At least one advantage of having an adapter 102 is an ability to obtain and otherwise interpret inputs from any class of dimmer controllers, such as those described above. The adapter 102 includes a configurable interface 104 suitable for interconnecting to at least one of a variety of different conventional dimmer controllers. The adapter 102 also includes a lighting control processor 106 in communication with the configurable interface 104. The lighting control processor 106 is adapted to generate a lighting unit command output in a lighting unit system command format in response to an input received from the conventional controller 102. In particular, for user-adjustable controllers, such an input received from the controller 102 provides an indication of a user-adjusted setting of the controller 102.

In at least some embodiments, the adapter 102 also includes a power distribution system interface 108. The power distribution system interface 108 is in communication with the lighting control processor 106 and adapted for interconnection to a power distribution system 110. The power distribution system interface 108 is adapted to superimpose the lighting unit system command output of the lighting control processor 106, onto the power distribution system 110, to allow for dissemination of the lighting unit system command to one or more electrical units to be controlled.

In at least some embodiments, the adapter 102 can be accommodated within a housing 112, such as an electrical housing or box 112 adapted to accommodate a typical single or multi-gang electrical switch. Accordingly, in at least some embodiments, such an adapter 102 can be installed together with a conventional controller 102, within a common multi-gang standard electrical box 112. The box 112 can be fed by an AC power feed or circuit 114, which can be split within the box 112 (e.g., using wire connectors 116) to power the adapter 102 and to a second set of electrical conductors 110 providing AC facility power to the adjustable power to one or more controlled electrical devices. The power distribution system interface 108 can be configured to convey an indication of the control setting to the one or more controlled electrical devices (e.g., lighting unit(s)) by any suitable powerline communications (PLC) protocol, such as those described herein and their equivalents.

In some embodiments, the configurable interface 104 reads an output of the conventional controller 102. Alternatively or in addition, the configurable interface 104 provides a stimulus 105 (shown in phantom) that produces a response 103 of the conventional controller 102, suitable for determining a user-adjusted setting of the controller 102.

In some embodiments, the configurable interface 104 includes the one or more dimmer control conversion circuits 14B (FIG. 2). In such embodiments, the lighting control processor 106 (e.g., the microprocessor 14D of FIG. 2) is configured to monitor inputs from each of the one or more dimmer control conversion circuits 14B. Thus, each conversion circuit 14B can be in independently in communication with the microprocessor 14D through a respective interface. The microprocessor 14D can routinely monitor each of the respective inputs, for example according to a schedule, to detect changes. Upon detecting a change, the microprocessor 14D can be configured to take a suitable action, such as generating the corresponding powerline control signals 14A.

In at least some embodiments, the powerline communication control system 100 also includes at least one device controller 120. In the example embodiment, the controller can be referred to as a powerline communication node and power supply 102. The device controller 120 includes a power distribution system interface 108 adapted for interconnection to the power distribution system 110. The device controller 120, also referred to as a command receiving interface, is further adapted to separate the lighting unit system command output from the power distribution system 110 when connected thereto. For example, the device controller 120 includes a powerline communication modem 122 receiving AC power including any superimposed lighting unit system command outputs. The powerline communication modem 122 is adapted to separate the received power and command signals into a separate AC power signal and a separate lighting unit command signal.

For controlled devices that operate under electrical power that might differ from the distributed (e.g., AC) power, the device controller 120 includes one or more power conversion modules 124. Such a power conversion module 124 can convert any suitable distributed power, such as AC or DC power, to any other suitable power, such as DC or AC power. Such power conversion modules 124 are commonly referred to as one or more of power supplies, power converters, and power inverters. In the illustrative example, the power supply 124 converts 110V AC to a DC power (e.g., 12 volts) suitable for controlling a solid state lighting unit 130. It is understood that one or more such power conversion modules 124 can be included and any given power conversion module 124 can be configured to provide more than one output (e.g., +/−12V, 5V, 3.3V). Such power outputs can be used to power one or more of the device controller 120 and any device modules connected thereto.

In the illustrative example, the device controller 120 includes a slave control processor 126 in communication with the command receiving interface 122 and adapted to convert the received lighting unit system command output into a corresponding lighting unit control command. The lighting unit control command is forwarded to the solid state lighting unit 130. In the illustrative embodiment, the solid state lighting unit 130 includes a lighting unit interface 132 adapted for interpreting the lighting unit control command and suitably driving the solid state lighting unit 130 in response to the user-adjusted setting of the interconnected one of the conventional dimmers 102.

For example, the solid state lighting unit 130 includes one or more LED modules or circuit boards 134. Each circuit board 134 can be populated with one or more lighting elements, or lamps, such as LEDs. One or more of the circuit board 134 and the individual LEDs, singly or in groups, can be independently addressable. For such embodiments, the lighting unit system command outputs can include messages having an address portion and a command portion. The slave control processor 126 interprets any received lighting unit system command output, for example, identifying an addressee as well as the command itself. The slave control processor 126 converts the received lighting unit system command output into a corresponding lighting unit control command. The command can include the address, which can be interpreted to one or more interconnected lighting units 130. Alternatively or in addition, the slave control processor 126 can be preconfigured with the addresses of any interconnected lighting units 130, selectively forwarding such messages to addressed lighting units 130.

Continuing with the illustrative example, a lighting unit system command output includes an address of the lighting unit 130 and a command to set the lighting unit 130 at an illumination level corresponding to a user-adjusted setting of the controller 102. The slave control processor 126 provides a suitable lighting unit control command instructing the lighting unit to illuminate at the user-desired setting. The lighting unit interface 132 receives the command and drives the LED board(s) 134 with a corresponding current to produce the user-desired illumination. The lighting unit 130 can remain at the desired setting until a subsequent command or instruction is received to change the illumination setting, in which instance, the lighting unit 130 will respond accordingly.

Although addresses are possible, it can also be possible to provide commands without an address or with a global address, in which instance all interconnected lighting units 130 respond to the instruction. It is also possible for more than one device controller 120 to independently control the same lighting unit 130. For example, the device controller 120 can receive inputs from more than one power distribution circuit 110, or a single power distribution circuit can be interconnected to more than one device controller 120. For such configurations, the device controller 120 can simply monitor received commands without regard to their source.

Thus, two separate controllers on a three-way controlled lighting unit 130 can independently control a setting of the lighting unit, for example, according to the last command received. In at least some embodiments, the device controller 120 is configured to send commands in response to a detected change in a user-adjusted setting of an interconnected controller 102.

In some embodiments, the device controller 120 can be included within the lighting unit 130. Alternatively or in addition, one or more of the power conversion module 124 and the slave control processor 126 can be included in the device controller 120, as illustrated, in the lighting unit 130, split between the device controller 120 and lighting unit 130, or even as separate modules.

Figure 6:
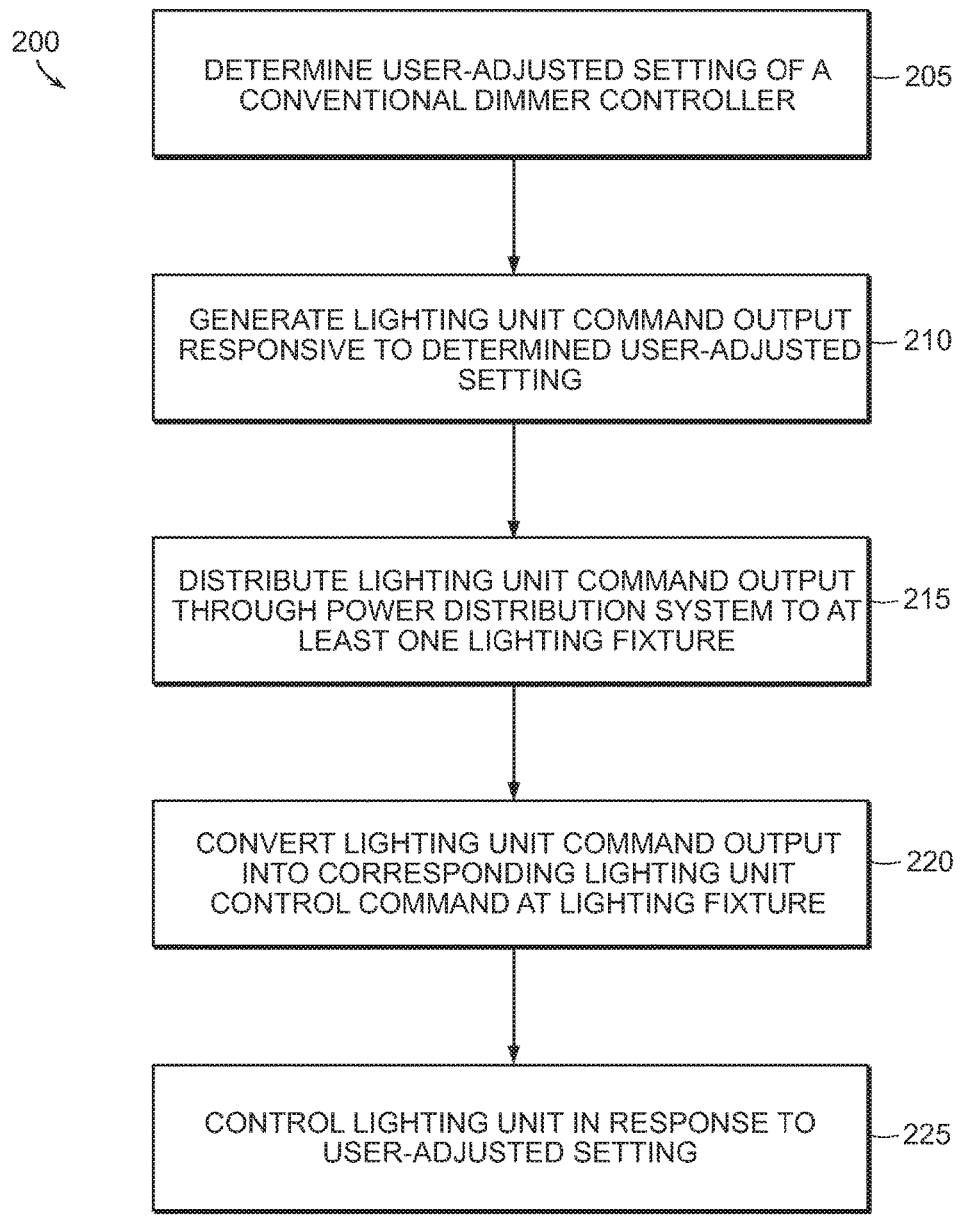
FIG. 6 is a flow diagram of an embodiment of a process for controlling lighting fixtures.

FIG. 6 is a flow diagram of an embodiment of a process 200 for controlling lighting fixtures. The process 200 includes determining a user-adjusted setting of a conventional dimmer controller at 205. A lighting unit command output is generated at 210, responsive to the determined user-adjusted setting. The lighting unit command output is distributed at 215, through power distribution system to at least one lighting fixture. The lighting unit command output is converted at 220, into corresponding lighting unit control command at lighting fixture. The lighting unit is controlled at 225, in response to user-adjusted setting.

While FIGS. 1 and 2 generally show use of a hard wire connection for coupling the standardized, conventional dimmer control 18 to the dimmer control conversion circuit 14B of the master controller 14 for supplying an input thereto, it is to be appreciated that such input signals can be supplied from the dimmer control 18 to the respective dimmer control conversion circuit 14B via either a conventional wireless connection or via a conventional Ethernet connection. As such arrangements are conventional and well known in the art, a further detailed description concerning the same is not provided.

It will be recognized with regard to the above descriptions of possible implementations of the powerline communication control system, according to the present invention that certain changes may be made in the above described improved powerline communication control system, without departing from the spirit and scope of the invention herein involved. For example, while a presently preferred embodiment of the invention is described and discussed in detail herein above, it must be recognized that different circumstances, other features or combinations of features described herein above may comprise a preferred embodiment other than the exemplary presently preferred embodiment described herein above. It is therefore intended that all of the subject matter of the above description or shown in the accompanying drawings shall be interpreted merely as examples illustrating the inventive concept herein and shall not be construed as limiting the invention.

What is claimed is:

1. A method for controlling a light emitting diode (LED) lighting unit via an LED lighting unit's power distribution system, the method comprising:

supplying operational power to the LED lighting unit via the LED lighting unit's power distribution system;

a user adjusting at least one conventional LED dimmer associated with the LED lighting unit;

at least one master controller coupled to the power distribution system and the at least one conventional LED dimmer, the master controller:

receiving, at a lighting control command processor, a lighting unit control input from the at least one conventional LED dimmer and generating corresponding lighting unit command outputs in a lighting system command format in response to an indication of the user-adjusted setting of the at least one conventional LED dimmer; and superimposing, at a power distribution system interface, the lighting unit command outputs onto the power distribution system and a power signal present thereon as a lighting command signal according to a lighting unit command transmission mode, and at least one device controller coupled to the at least one master controller and the LED lighting unit, each device controller:

receiving at a command receiving interface, the lighting command signal, separating the lighting command signal from the power signal, and generating corresponding lighting control commands, converting, at a lighting control processor, the received lighting control commands into lighting unit control commands; and providing, at a lighting unit interface, the lighting unit control commands to the LED lighting unit to control the LED lighting unit in response to the user-adjusted setting of the at least one conventional LED dimmer.

2. The method of claim 1, further comprising, for each conventional LED dimmer, converting, at a corresponding lighting control conversion circuit, control inputs from a corresponding conventional dimmer lighting controller into corresponding command inputs to the lighting control processor.

3. The method of claim 1, wherein the power distribution system is selected from the group consisting of an AC line; a 117 volt AC line; a 230 volt AC line; a 100 volt AC line; a 277 volt AC line; a 347 volt AC line; a DC line; a 380 volt DC line; a 48 volt DC line; a 24 volt DC line; a 12 volt DC line; and combinations thereof.

4. The method of claim 1, wherein the at least one conventional LED dimmer is coupled to a respective master controller for supplying a respective conventional LED dimmer control input thereto.

5. The method of claim 4, wherein the at least one conventional LED dimmer is selected from the group consisting of: digital multiplex (DMX) dimmers; 0-10 volt dimmers; TRIAC dimmers; electronic low voltage (ELV) dimmers; and current loop controllers.

* * * * *